April 21, 1931.    T. J. DRISCOLL    1,801,909
RECORD KEEPING APPLIANCE
Filed March 16, 1929    2 Sheets-Sheet 1
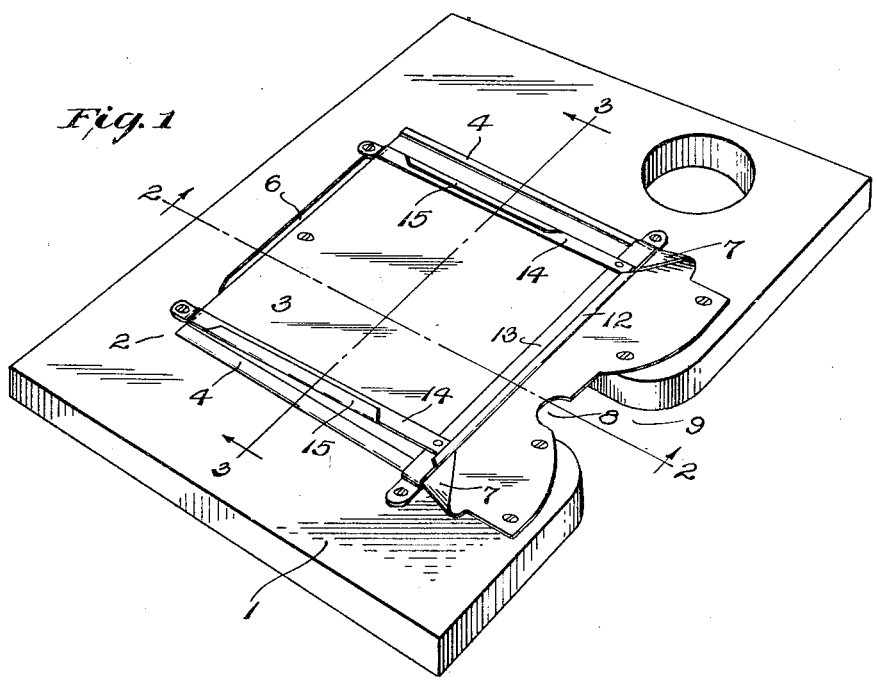
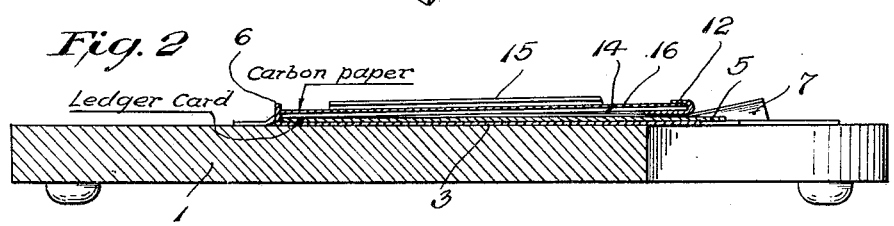
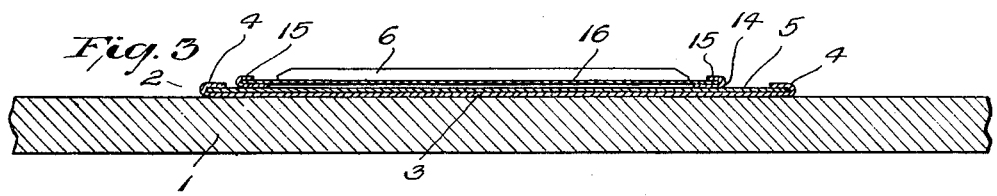
Inventor
T. J. Driscoll
By W. S. McDowell
Attorney April 21, 1931.  T. J. DRISCOLL  1,801,909
RECORD KEEPING APPLIANCE
Filed March 16, 1929  2 Sheets-Sheet 2
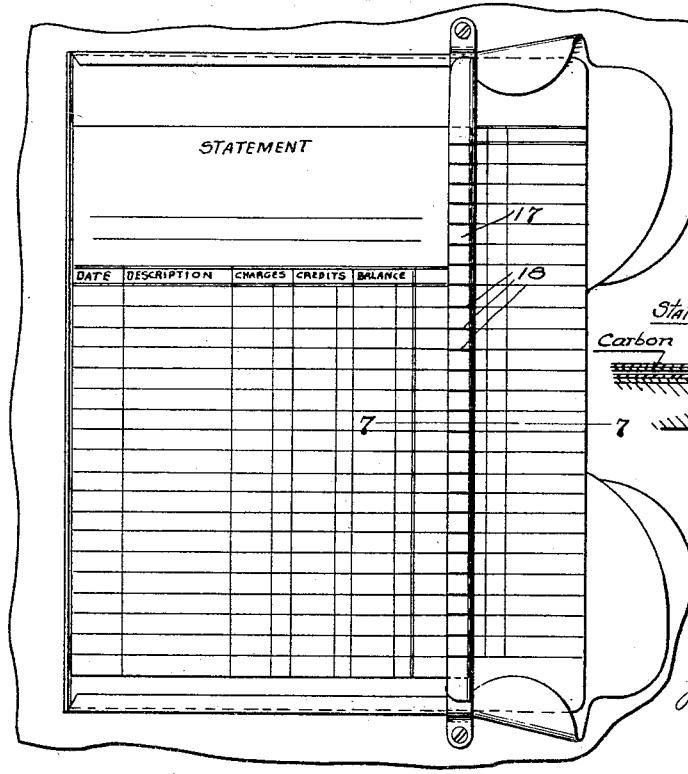
Inventor
T. J. Driscoll
W. S. McDowell
Attorney Patented Apr. 21, 1931

1,801,909

UNITED STATES PATENT OFFICE

THOMAS J. DRISCOLL, OF COLUMBUS, OHIO

RECORD-KEEPING APPLIANCE

Application filed March 16, 1929. Serial No. 347,679.

This invention relates to bookkeeping or record keeping apparatus, and has for its primary object the provision of simple yet efficient means for facilitating the recording or entering of commercial accounts to the end of expediting the operation, minimizing error and to permit errors to be readily detected and corrected when made.

It is another object of the invention to provide a system and apparatus for keeping commercial accounts such as bank savings and building and loan records, and particularly the records maintained by credit houses and other establishments wherein it is necessary at intervals to make records of payments in connection with various kinds of accounts. In most of these systems the payor receives an account book on the pages of which the various payments are entered at the time they are made. Also, the merchant or payee keeps a separate record which is maintained with the intention of duplicating the entries which appear on the account book of the payor. Usually, the entries appearing on the records of the payor and payee are made separately by different operations and for this reason considerable time is taken in the proper entry of the records and mistakes are quite likely to occur.

In accordance with the present invention, apparatus is utilized comprising a holder which easily and removably receives the account book of the payor when the latter is in open or extended condition. The holder is so formed that beneath the sheet or page of the payor's account book there is positioned a sheet of carbon paper having the impression producing surface thereof turned downwardly in order to be in close association with a removable ledger sheet or card, constituting a part of the merchant's or the payee's record and which relates to and forms a part of the record account of both payor and payee.

It is therefore an outstanding object of the present invention, through the provision of this holder and the record forming materials associated therewith, whereby the original entry made in the account book of the payor will be, with the same operation, applied to the ledger or account sheet of the payee, appearing on such ledger sheet in exactly the same form as the entry appears on the account book of the payor, this being attained by the inter-position of the carbon paper and the general mechanical structure of the holder.

In this respect, it is a further object of the invention to form the holder so that the latter will retain in registration the duplicate entry blanks appearing in both the account book of the payor and the ledger sheets of the payee. To insure this relative registration the entry blanks appearing on both sheets are consecutively numbered to prevent the possibility of error.

For a further understanding of the invention reference is to be had to the following description and the accompanying drawings, wherein:

Figure 1 is a perspective view of the record holder employed in connection with the present invention, Figure 2 is a vertical sectional view taken through the holder on the line 2—2 of Figure 1, Figure 3 is a similar view on the line 3—3 of Figure 1 (in both Figures 2 and 3 the ledger card and the carbon paper are shown in cross-section in their inserted positions within the holder), Figure 4 is a plan view of the ledger card or sheet, Figure 5 is a similar view of a payor's account or receipt book, showing the latter in open position with the entry receiving spaces thereof illustrated, Figure 6 is a front elevation of a slightly modified form of holder which has been designed for use in connection with larger record sheets, and Figure 7 is a vertical transverse sectional view taken on the line 7—7 of Figure 6.

Referring more particularly to the drawings, the numeral 1 designates a base member formed from any suitable material and which may be either portable or may constitute a part of a stationary article of furniture, such as a counter, table top, shelf or the like. Applied to the upper surface of the base member is a metallic holder 2 formed to comprise a bottom plate 3. The upper and lower edges of the plate 3 are turned upon themselves to provide parallel guide flanges 4 which slidably receive the corresponding upper and lower edges of a ledger sheet or card 5. The left vertical edge of the plate 3 is provided with an upstanding rib 6 which operates to limit the inward sliding movement of the card 5. The card receiving ends of the flanges 4 are enlarged and flared to produce substantially funnel-shaped members 7 which facilitate the entrance of the card into the holder, permitting the operation to be carried out quickly and conveniently. The right side of the plate 3 is recessed or cut away as indicated at 8 in registration with a corresponding recess 9 provided in the base member 1. The recesses 8 and 9 are provided in order to permit the clerk to manually force the card into its operating position within the holder without interference on the part of the plate 3 and the base member 1. The recesses also provide similar convenience in the removal of the card from the holder.

The ledger card 5 may be of any suitable shape and formed from any desired materials, but usually a stiff grade of paper is utilized. The sheet or card 5 constitutes but one of a number of duplicate cards constituting a ledger record. Suitable indicia may, of course, appear on the card such as the name and address of the payor, the number of the account, if it is given a filing number, and other general information concerning the payor or customer. Below this general information the card is divided by horizontal lines for the making of entries thereon and suitable headings appear in connection with these rows. For example, the date when the entry or entries are made; the charges, credits, the balance, the initials of the clerk making the entry or entries, the account number and a vertical column for "Remarks". To the right of the "Remarks" column, there appears a Number column which provides for the consecutive numbering of the various horizontal spaces provided on the card in which the entries are made. The card or ledger 5 constitutes a part of the merchant or payee's record. The customer or payor, when an account is made, is given a receipt book, indicated at 10. This receipt book contains papers which bear indicia, indicated at 11, which corresponds in every respect to the indicia above noted appearing on the face of the ledger card 5, with the exception of the name and address above the entry blanks. The entry spaces appearing on both the receipt book pages and the card ledger are of the same size, and the holder is constructed to hold in registration this indicia.

In the use of my system, when a customer or depositor desires to make a payment his ledger card 5 is removed from the ledger record and placed face upwardly on the holder and securely retained against displacement in connection with the holder by the flanges 4 and the rib 6. Then, the holder has its upper surface provided with a stationary frame 12 consisting of a vertical strip 13 and a pair of horizontally extending strips 14, which strips are provided with flanges 15. These strips and flanges operate to receive and to hold against displacement a sheet of carbon paper or other transfer medium 16. The carbon paper is placed face downwardly within the frame so that its impression imparting surface will be arranged immediately over the entry receiving spaces appearing on the ledger sheet or card.

Following the insertion of the ledger card 5 in the holder, the clerk opens the receipt or account book of the customer or depositor to a full opened position in which the record book is received in the flanges formed in connection with the horizontal strips 14 of the frame 12 and is in engagement with the rib 6 of the plate 3. When thus positioned, the clerk makes an ordinary entry on the proper space provided therefor in the record book. Due to the provision of the carbon paper 16 and the predetermined and fixed position of the ledger card, the entry made by the clerk in the record book is transferred automatically and simultaneously to the ledger card so that both entries are performed at the same time and are duplicates. The receipt book is then removed from the holder and returned to the payor, and the ledger card is removed from the holder and placed in the file of the payee. The carbon sheet, of course, remains in its fixed position and is only removed and renewed after it has been worn and needs replacement. As the carbon sheet is held stationary within the holder, the same is protected from becoming torn, misplaced or mutilated and eliminates entirely the necessity of handling the carbon sheet when making entries.

The upper horizontal strip 14 is preferably spaced from the flange 4 of the plate 3 so that the ledger card is visible above the carbon sheet. This is important in that the person making the entry can see such information as the account number, terms, etc., without removing the ledger sheet from the holder.

In the modified form of the invention, which is adapted for the reception of stationery of larger sizes, the holder is provided with a vertical channel strip 17, having its upper surface marked with spaced horizontal lines 18, which correspond with the horizontal lines appearing on the statement and the ledger sheet. In this form of the invention the statement does not posses the same basic size as the ledger sheet. For this reason the statement is movable vertically across the holder while retained within the channel strip 17 in order that the horizontal entry spaces provided on the statement may be brought into desired registration with any of the spaces provided upon the bottom of the ledger sheet, the horizontal lines 18 appearing on the strip 17 serving to insure this feature. This holder is particularly useful in writing or posting monthly statements, as by use of the channel strip 17 the statement may be moved to any desired line, that is, an entry can be made on line 19 of the ledger or account sheet and line 3 of the statement, or vice versa. In the preferred form of the invention the receipt book or sheet is held stationary against movement, while in the modified form of the invention vertical shifting of the statement sheet is preferred, but provision is made for readily effecting its registration with the proper spaces on the ledger sheet.

What is claimed is:

1. A record keeping appliance of the character set forth comprising a base member, fixed guides carried by said base member adapted for the reception of a ledger card, said guides serving to retain said card in a desired fixed position on said base member, and a frame applied to said base member arranged immediately adjacent to said guides and formed to receive and support a sheet of carbon paper to retain the latter in a spaced and stationary position over the entry receiving spaces formed on the ledger card, said frame also serving to stationarily position a receipt sheet in registration with said ledger card and above said carbon.

2. A bookkeeping appliance comprising a base, a holder mounted on said base formed to include a bottom plate having flanged upper and lower edges and a ribbed side edge, said flanges constituting channel guides for the reception of a removable ledger card, the ribbed side edge of the holder serving to limit inward sliding movement of the card into said holder, and a frame formed with said holder for positioning and supporting a sheet of carbon paper over the ledger card and in spaced relation from said card, said frame also serving to support and retain a receipt sheet in registration with said ledger card.

3. A bookkeeping appliance of the character described comprising a base, fixed horizontally extending guides carried by said base and adapted to receive a ledger card to retain the latter in a pre-determined position in connection with said base, stationary stop means for limiting the inserting movement of said card into said guides, a superposed stationary frame carried by said base for retaining and supporting a sheet of carbon paper in a spaced and stationary position over a ledger card positioned in said guides, said frame being adapted to retain a receipt sheet in registration with said ledger card.

4. A bookkeeping appliance comprising a base, fixed guides carried by said base and adapted for the reception of a ledger card to retain the latter in a pre-determined position upon said base, said base being recessed to facilitate the insertion and removal of the ledger card into and from said guides, and a stationary frame arranged above said guides and adapted to receive and support a sheet of carbon paper in order to relatively space the latter from said ledger card but in registration with the entry receiving blanks appearing on said card, said frame also serving to support and retain a receipt sheet in registration with said ledger card.

5. A record keeping appliance comprising a base, a holder mounted on said base formed to include a plate having flanged upper and lower edges and a ribbed side edge, said flanges being formed with enlarged entrance portions which together with said flanges constitute channels for the reception of a removable ledger card, and a frame formed with upper and lower guides positioned above and substantially parallel with the upper and lower edges of said plate, the upper of said guides being spaced from the upper of said flanges so as to provide a sight opening therebetween, said guides serving as a holder for positioning a sheet of carbon paper over the ledger card and in spaced relation from said card, said guides also serving in connection with said ribbed side edge as a positioning means for a receipt sheet in registering relation with said ledger card.

6. A book keeping appliance comprising a base, fixed upper and lower guides formed in connection with said base for stationarily positioning a removable ledger sheet in connection with said base, an open frame arranged above said guides and formed to receive a sheet of carbon paper in a stationary position slightly spaced from said ledger sheet, said frame also serving to stationarily position a receipt card in registration with said ledger sheet.

In testimony whereof I affix my signature.

THOMAS J. DRISCOLL.